United States Patent

Hawkins

[15] 3,674,177
[45] July 4, 1972

[54] INDICATING MEANS FOR AN AUTOMATIC DISPENSER CONTROL SYSTEM

[72] Inventor: Royal R. Hawkins, Bloomington, Minn.
[73] Assignee: Honeywell Inc., Minneapolis, Minn.
[22] Filed: Oct. 7, 1970
[21] Appl. No.: 78,701

[52] U.S. Cl. .............................................................. 222/52
[51] Int. Cl. ............................................................ B67d 5/08
[58] Field of Search ............................ 222/52, 178; 239/155

[56] References Cited

UNITED STATES PATENTS 3,511,411  5/1970  Weiss ................................. 222/178 X

*Primary Examiner*—Samuel F. Coleman
*Attorney*—Lamont B. Koontz and Omund R. Dahle

[57] ABSTRACT

Apparatus for controlling the rate at which oil is dispensed from a moving vehicle embodying a control loop having a means for sensing the speed of the vehicle and for providing a signal representative of the desired amount of oil to be dispensed as a function of the speed of the vehicle, means for sensing the amount of oil actually being dispensed, and means for comparing the desired amount of oil to be dispensed to the amount of oil actually being dispensed for controlling the amount of oil being dispensed wherein a monitoring loop is connected to the control loop in such a manner as to be functionally independent of the control loop to indicate whether or not the actual amount of oil being dispensed equals the desired amount of oil to be dispensed.

18 Claims, 2 Drawing Figures

INVENTOR.
ROYAL R. HAWKINS
BY Osmund R. Dahle
ATTORNEY.

INDICATING MEANS FOR AN AUTOMATIC DISPENSER CONTROL SYSTEM

In preparing road surfaces for paving and in wetting down gravel roads to inhibit clouds of dust from being raised by passing automobiles, it is common to spray oil on the road beds or gravel road surfaces. The spraying is generally accomplished by pumping oil onto the road from an oil tank mounted on a moving vehicle. However, unless some sort of automatic control is used to regulate the amount of oil sprayed, it is difficult, if not impossible, to distribute the oil evenly onto the road. Such uneven distribution results in inefficiency and hazard.

This uneven distribution arises from a number of sources. One source is the variations in speed of the vehicle; that is, if the pump is dispensing a constant volume output of oil, then a variation in speed of the vehicle will result in an uneven distribution of oil upon the road.

This source of uneven distribution can be reduced by providing an automatic control of the amount of oil dispensed by the pump as a function of the speed of the vehicle. According to the objects of this invention, such automatic control of the pump can be effectuated by providing a means for sensing the speed of the vehicle and producing a signal representative of the desired amount of oil to be sprayed, a means for sensing the actual rate at which oil is dispensed from the vehicle and producing a signal commensurate therewith, a comparison means for comparing these two signals for providing a signal to bring the pump output to the desired value and an apparatus to effectuate control of pump in response to the comparison means.

However, such automatic control gives rise to yet another source of difficulty. A hydraulic system is selected to drive the pump, but this hydraulic system gives rise to a droop in the control loop. It is to be noted that an electrical system could have been chosen to drive the pump, but this electrical system would also have been subject to droop due to the losses in the system. This droop results in a difference between the desired amount of oil to be sprayed from the vehicle and the actual amount of oil being sprayed, and results from leakages in the hydraulic system which effects a change in the amount of oil actually sprayed with respect the desired amount of oil to be sprayed, the operational characteristics of the hydraulic systems which are different for different temperatures, the non-linearities of the comparator which cause an output different from that of the input, use of separate prime movers to drive the machine and the pump wherein different speed regulations of these separate prime movers result in droop, and the output pump which is subject to variations in output due to variations in loading. Furthermore, there is a certain amount of droop inherent in an electrical control loop system.

According to a further object of this invention, a monitoring loop is connected to this control loop in such a manner as to be functionally independent of the control loop and is, therefore, not subject to control loop droop. That is, the monitoring loop is effectively isolated from the control loop droop. This monitoring loop comprises, in part, a Null meter which compares the desired amount of oil to be sprayed to the amount of oil actually being sprayed, and if there is any difference, the Null meter will indicate this difference. A trim adjustment potentiometer is then provided to adjust the actual amount of oil being sprayed to equal the desired amount of oil to be sprayed. As a result of this adjustment, the effect of droop in the control loop is removed.

It is to be noted, however, that the control system is not limited to an oil dispensing apparatus, but could be used whenever an output is to be operated at a selected ratio of a sensed condition. That is, whenever it is necessary to control the condition (e.g., speed, output, etc.) of a driven member or load at a predetermined ratio with respect to another driven member, this system will insure that this desired ratio is attained. For instance, the system may be used to insure that the speed of one motor is controlled at a desired percentage or ratio with respect to the speed of a second motor. Another example of a non-oil spraying use would be the control of the carriage feedrate on a lathe where the speed of the operation of the tool is to be operated at a certain ratio with respect to the rotation speed of the workpiece. Thus, although an oil dispensing apparatus is to be used as an example only, this example is not to be considered as having a limiting effect on the interpretation of the claims or specification.

SUMMARY OF THE INVENTION

A first means senses the speed of the oil spraying vehicle and produces a signal commensurate with the desired amount of oil to be sprayed. This signal is compared with the actual amount of oil being sprayed to control the volume of oil dispensed. A monitoring loop is included to insure that the actual amount of oil being sprayed is the same as the desired amount of oil to be sprayed.

DETAILED DESCRIPTION OF THE DRAWINGS

Figures 1, 2:
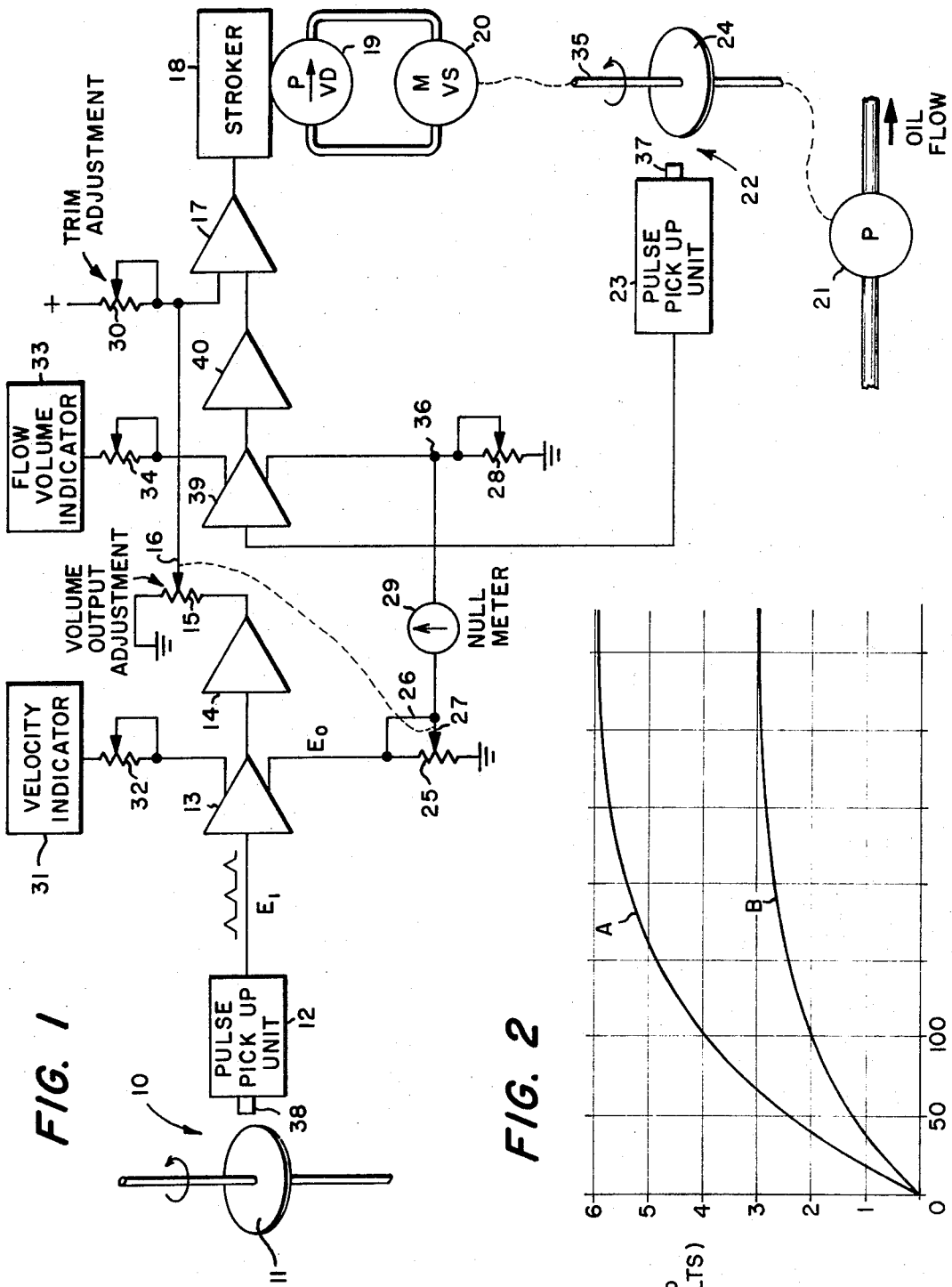
FIG. 1 is a schematic drawing of the oil spraying apparatus.
FIG. 2 is a graph showing the operation of part of this apparatus.

In FIG. 1, the control loop, which controls the actual amount of oil being sprayed with respect to the desired amount of oil to be sprayed, will first be described. This control loop comprises a pulse pick-up unit 10 having a disc 11 with ferromagnetic segments (not shown) thereon and a coil unit 12 which will produce a series of output pulses as the ferromagnetic segments pass the core 38 of the coil. The disc 11 can be connected to a fifth wheel or to the vehicle axle or can comprise the sprocket wheel which drives the vehicle wheels. These pulses from the coil 12 are applied to an amplifier 13 which operates as a frequency to DC converter. Thus, as the speed of the vehicle changes, the frequency of pulses out of coil 12 will change resulting in a change in the level of DC output from the amplifier 13.

Following this control loop further, the output from amplifier 13 is amplified by a power amplifier 14 and fed into a volume output potentiometer 15. Potentiometer 15 is a set point device and is used to select the density of oil, i.e., the number of gallons per square yard, that the oil spraying apparatus will apply to the road. Once this value has been set into the system by potentiometer 15, a change in speed will result in a change in the amount of oil sprayed to tend to keep the density of oil sprayed constant. The output of potentiometer 15 is taken off by movable arm 16 and fed into a comparator-amplifier 17. The comparator-amplifier 17 then controls stroker 18 which in turn controls the volume of hydraulic fluid pumped by the variable pump 19. The volume of hydraulic fluid pumped by 19 controls the speed at which the hydraulic motor 20 drives the output shaft 35. The rotational speed of shaft 35 will determine the amount of oil sprayed by the pump 21.

The rotational speed of shaft 35 will be representative of the amount of oil dispensed by the pump 21 and is sensed by the pulse pick-up unit 22 which comprises a coil 23 having a core 37 sensing the speed at which the shaft 35 rotates a disc 24. Pulse pick-up unit 22 operates in the same manner as the pulse pick-up unit 10 and provides a series of pulses the frequency of which corresponds to the rotational speed of shaft 35 which in turn corresponds with the rate of oil dispensed by pump 21. The pulses from coil 23 are fed into a frequency-to-DC converter 39. The frequency-to-DC converter 39 has three outputs: one output goes to a flow volume indicator 33; a second output goes to junction 36; and, the third output goes to power amplifier 40. The output from power amplifier 40 is fed into the comparator-amplifier 17 which compares the DC voltage obtained from the pulse pick-up unit 23 to the DC voltage supplied by the arm 16 of potentiometer 15. Thus, any change in the DC voltage from arm 16 results in a corresponding change in the output of comparator-amplifier 17 to change the rate of output from the pump 21. A change in the output of a pump is brought about by a change in the speed at which shaft 35 rotates which results in a change in the DC voltage supplied as the result of the pulse pick-up unit 22. The output of pump 21 will continue to change until the DC signal supplied from potentiometer arm 16 approximately equals the DC signal supplied as a result of the signals received from the pulse pick-up unit 22. It is the nature of a servo follow-up system that there must be a difference in the voltages supplied to the comparator-amplifier 17 by pulse pick-up units 22 and 10 since without this voltage difference there would be no voltage on the output from the comparator-amplifier 17 and, therefore, there would be no output from the pump 21.

The amplifiers 13, 14, 39, 40 and 17 basically consist of two amplifier packages. One package includes amplifiers 13 and 14 as well as an unused comparator-amplifier and the other package includes amplifiers 39, 40 and 17. These packages are identical; however, the comparator-amplifier in the first package comprising amplifiers 13 and 14 is not used in this configuration. These amplifiers are standard products of Honeywell Inc. having a product number W883. It is deemed that a detailed description of the content of these amplifiers will not aid in an understanding of the present system.

As discussed above, the hydraulic system of this apparatus is subject to droop. Also, the control loop is subject to droop due to the fact that in order for pump 21 to produce an output flow of oil, there must be an output from the amplifier 17 to the stroker 18 and, thus, there must be a voltage difference between the inputs to the comparator-amplifier 17. Should the two voltages fed into the comparator-amplifier 17 ever become equal, due to a sudden reduction in vehicle speed, the pump will stop dispensing oil and the input to the comparator-amplifier 17 will decrease in the DC level due to a reduction in frequency from the pulse pick-up unit 22 because of a reduced shaft speed 35 which results from the lack of voltage on the output of comparator-amplifier 17. As the shaft speed of 35 slows down, the frequency output from pulse pick-up unit 22 will decrease and a voltage difference will again appear on the inputs to comparator-amplifier 17 thus producing an output on the stroker 18 which will again drive the pump to produce an oil flow output. To compensate for this droop, a monitoring loop is connected to the control loop, but connected in such a manner as to be functionally independent of the control loop and therefore independent of the droop inherent in the control loop. The monitoring loop will indicate any difference between the actual output of oil and the desired amount of oil to be sprayed. A trim adjustment potentiometer 30 is included to adjust the input from potentiometer 15 to the comparator-amplifier 17 and thus adjust the actual amount of oil being sprayed by pump 21.

The monitoring loop comprises a rheostat 25 connected to one of the outputs of amplifier 13. The signal current on this output represents the speed at which the vehicle is moving and is proportional to the signal from the output of amplifier 13 to amplifier 14. The rheostat 25 has a shorting segment 26 connected between the top part of the resistance and the movable arm 27. The movable arm 27 of rheostat 25 is mechanically connected to the movable arm 16 of potentiometer 15 for simultaneous operation therewith. Thus, when arms 16 and 27 move together, both of the signals on these arms represent the desired amount of oil to be dispensed by pump 21. Null meter 29 is connected between the movable arm 27 and the junction point 36 and junction point 36 is connected to the output of the frequency-to-DC converter 39. The signal current on this output is proportional to the pulse rate from pulse pick-up unit 22 and, thus, represents the speed at which shaft 35 rotates. A calibration resistor 28 is included to insure that the signal from the amplifier 39 which is fed to junction 36 is an accurate measurement of the gallons per square yard of oil dispensed by pump 21. Should the Null meter read something other than zero, then the pump 21 is not dispensing the requisite amount of oil as commanded by the output from potentiometer 15. Assuming a constant speed of the vehicle, such a non-null reading occurs because of the droop in the control loop. A trim adjustment potentiometer 30 is included in the circuit to correct for the droop until the actual amount of oil being sprayed equals the desired amount of oil to be sprayed.

Rheostat 25 is used instead of a potentiometer because of the non-linearity of the output of amplifier 13. Such non-linearity in the output from this amplifier is due to the inherent nature of the components of the amplifier. An example will facilitate the understanding of the use of this rheostat. FIG. 2 shows the output voltage wave form of amplifier 13 as a function of the frequency of the input. Wave form A represents the voltage wave form when movable arm 27 is at the top of the resistance of rheostat 25 and wave form B represents the voltage wave form when the movable arm 27 is midway between the top and the bottom of the resistance of the rheostat 25. FIG. 2 shows that, between 0 and 1 volt, the wave form is substantially linear whereas above 1 volt the wave form becomes non-linear. Supposing that a potentiometer had been used in place of the rheostat, that is shorting terminal 26 had been removed, then if the voltage at the top of the potentiometer is at 2 volts, the movable arm, although it is at 1 volt, will see the non-linearity produced by the 2 volt output of amplifier 13. Thus, although the arm 27 is at 1 volt, the voltage wave form will be non-linear. Because the voltage of arm 27 is 1 volt, the control loop will cause the voltage at junction 36 to be 1 volt. But the voltage at point 36 will be linear because it represents a 1 volt output of the amplifier 39, and therefore, the meter will not give a true indication of the relation between the actual output from pump 21 and the desired output due to a non-linear voltage being compared to a linear voltage.

Such an inaccurate indication is made evident by assuming that coil 12 is producing 100 pulses per second and assuming that such a frequency produces 2 volts from amplifier 13 and further assuming that this 100 pulses per second from 12 will drive the pump at such a speed as to produce 50 pulses per second from coil 23. These assumptions are perfectly valid since they may easily be programmed into the system by the selection of appropriately sized circuit components. The 50 pulses per second output from coil 23 will produce a voltage at junction 36 of 1 volt. However, should the frequency output from coil 12 fall to 50 pulses per second, the output voltage from amplifier 13 will fall to 1.1 volts rather than 1 volt because of the non-linearity of the voltage wave form. When this 1.1 volts is halved because of the setting of the arm 27, the left side of the meter 29 will see 0.55 volts. However, because the frequency of the pulse pick-up unit 10 was halved, the frequency from pulse pick-up unit 22 will be halved such that the output voltage at 36 will be halved since the output at junction 36 is operating at the linear portion of the wave form from amplifier 39. Thus, the right side of Null meter 29 reads 0.5 volts. Although the pump is dispensing the correct amount of oil, the Null meter 29 will indicate that pump 21 is operating at a value other than the desired value. If the output of the pump is adjusted such that meter 29 will read a null condition, then the actual amount of oil being sprayed will no longer equal the desired amount of oil to be sprayed.

Such non-linear operation of the meter 29 can be eliminated by using a rheostat 25 in place of a potentiometer. Thus, the top part of the resistance of the rheostat is tied to the movable arm such that the voltage at the top part of the resistance will be 1 volt. The amplifiers 13 and 39 act as a constant current source for a given frequency of input pulses from the pulse pick-up units. Thus, 100 pulses per second output of the pulse pick-up unit 10 will produce a 1 volt output from amplifier 13 which will place the left side of the Null meter on a linear portion of the wave form of the voltage from amplifier 13. As a result, if the pump 21 is dispensing the desired amount of oil, the voltages on both sides of the meter 29 will be equal and the meter will give the 0 or null indication.

OPERATION OF THE SYSTEM

In operation, the desired amount of oil per square yard is set by use of potentiometer 15. Potentiometer 15 thus selects a portion of the signal from amplifiers 13 and 14 and feeds this proportional amount to the comparator-amplifier 17. As the speed of the vehicle changes, the frequency of the signal fed into amplifier 13 changes resulting in a change in the DC level of the output of amplifier 13, thus changing the input from potentiometer 15 to comparator-amplifier 17. The comparator-amplifier 17 will compare the signal from potentiometer 15, which represents the desired amount of oil to be sprayed, to the signal from amplifiers 40 and 39 which converts the frequency output from pulse pick-up unit 22 to a DC level representative of the amount of oil dispensed by pump 21. The signal out ot the comparator-amplifier 17 then represents the error between the desired amount of oil to be dispensed and the actual amount of oil being dispensed by pump 21. This error is used to control the stroker 18 to control pump 21 which will tend to dispense the desired amount of oil. Should the control loop be subjected to droop, the Null meter will indicate that the actual amount of oil dispensed by the pump 21 is not the same as the desired amount of oil to be sprayed as commanded by potentiometer 15 working in conjunction with the pulse pick-up unit 10 and the amplifier 13. Thus, the trim adjustment potentiometer 30 can be adjusted to bring the output of pump 21 up to the desired level.

Meters 31 and 33 together with their respective calibration resistors 32 and 34 will indicate the speed of the vehicle and the gallons per minute output of the pump, respectively.

The advantage of this total system is that it allows extremely accurate ratioing between the actual output and the desired output. That is, the system insures that the hydraulic motor 20 will operate at a certain speed with respect to the speed of the vehicle.

As changes can be made in the above-described construction and many apparent different embodiments of this invention can be made without parting from the scope thereof, it is intended that all matter contained in the above description or shown on the accompanying drawings be interpreted as illustrative only and not in a limiting sense.

The embodiments of the invention in which an exclusive property or right is claimed are defined as follows:

1. Apparatus adapted to control the output of a driven load device according to a condition being sensed with respect to an independently driven reference device wherein a change in the condition being sensed with respect to said driven reference device results in a change in the output of the driven load device such that said driven load device operates at a selected ratio of said driven reference device, said apparatus comprising:
    a control loop comprising;
        condition sensing means for producing a signal representative of said condition of said driven reference device,
        first means responsive to said signal representative of said condition for producing a signal representative of the desired output of said driven load device,
        second means for generating a signal representative of the actual output of said driven load device, and
        comparison means for comparing the signal representative of the desired output to the signal representative of the actual output and for producing a correction signal adapted to correct the actual output so that the actual output tends to equal the desired output, and
    a monitoring loop connected to the control loop in such a manner as to be functionally independent of said control loop, said monitoring loop comprising;
        indicating means for comparing the signal representative of said condition to said signal representative of the actual output for indicating the deviation of said actual output from said desired output.

2. Apparatus as set forth in claim 1 wherein said first means comprises a potentiometer for converting the signal representative of the sensed condition into the signal representative of said desired output.

3. Apparatus as set forth in claim 2 wherein said indicating means comprises a Null meter, and a rheostat for connecting the Null meter to said condition sensing means, said rheostat and said potentiometer being ganged together for simultaneous operation and said rheostat converting the signal representative of said sensed condition into a signal representative of said desired output.

4. Apparatus as set forth in claim 3 further comprising trim adjustment means connected to said comparison means to produce a null reading on said Null meter whenever the Null meter indicates that the actual output does not equal the desired output.

5. Apparatus as set forth in claim 3 wherein said condition sensing means comprises a sensor for sensing the condition and an amplifier connecting said sensor to said potentiometer.

6. Apparatus as set forth in claim 5 further comprising trim adjustment means connected to said comparison means to produce a null reading on said Null meter whenever the Null meter indicates that the actual output does not equal the desired output.

7. Apparatus as set forth in claim 1 wherein said condition sensing means comprises a sensor for sensing the condition and an amplifier connected to said sensor for producing the signal representative of said condition.

8. Apparatus as set forth in claim 1 wherein said indicating means comprises a Null meter, and a rheostat connecting the Null meter to said condition sensing means such that the rheostat converts the signal representative of said sensed condition into a signal representative of said desired output.

9. Apparatus as set forth in claim 8 further comprising trim adjustment means connected to said comparison means to produce a null reading on said Null meter whenever the Null meter indicates that the actual output does not equal the desired output.

10. Apparatus adapted to control the dispensing of material from a moving vehicle wherein a change in speed of the vehicle results in a change in the output of material dispensed, said apparatus comprising:
    a control loop comprising;
        speed sensing means for producing a signal representative of vehicle speed,
        first means responsive to said signal representative of vehicle speed for producing a signal varying as a function of speed and representative of the desired amount of material to be dispensed,
        second means for generating a signal representative of the actual amount of material being dispensed, and
        comparison means for comparing the signal representative of the desired amount of material to be dispensed to the signal representative of the actual amount of material to be dispensed and for producing an output signal adapted to correct the actual amount of material being dispensed so that the actual amount of material being dispensed tends to equal the desired amount of material to be dispensed, and
    a monitoring loop connected to the control loop in such a manner as to be functionally independent of said control loop, said monitoring loop comprising;
        indicating means for comparing the signal representative of the vehicle speed to said signal representative of said actual amount of material being dispensed for indicating the deviation of said actual amount of material being dispensed from the desired amount of material to be dispensed.

11. Apparatus as set forth in claim 10 wherein said first means comprises a potentiometer for converting the signal representative of vehicle speed into the signal representative of said desired amount of material to be dispensed.

12. Apparatus as set forth in claim 11 wherein said indicating means comprises a Null meter and a rheostat for connecting the Null meter to said speed sensing means, said rheostat and said potentiometer being ganged together for simultaneous operation and said rheostat converting the signal representative of said vehicle speed into a signal representative of said desired amount of material to be dispensed.

13. Apparatus as set forth in claim 12 further comprising trim adjustment means connected to said comparison means to produce a null reading on said Null meter whenever said Null meter indicates that the actual amount of material being dispensed does not equal the desired amount of material being dispensed.

14. Apparatus as set forth in claim 12 wherein said speed sensing means comprises a sensor for sensing speed and an amplifier connecting said sensor to said potentiometer.

15. Apparatus as set forth in claim 14 further comprising trim adjustment means connected to said comparison means to produce a null reading on said Null meter whenever the Null meter indicates that the actual amount of material being dispensed is not equal to the desired amount of material being dispensed.

16. Apparatus as set forth in claim 10 wherein said speed sensing means comprises a sensor for sensing speed and an amplifier connected to said sensor for producing the signal representative of vehicle speed.

17. Apparatus as set forth in claim 10 wherein said indicating means comprises a Null meter, and a rheostat for connecting the Null meter to said speed sensing means such that said rheostat converts the signal representative of vehicle speed into a signal representative of the desired amount of material to be dispensed.

18. Apparatus as set forth in claim 17 further comprising trim adjustment means connected to said comparison means to produce a null reading on said Null meter whenever the Null meter indicates that the actual amount material being dispensed does not equal the desired amount of material being dispensed.

* * * * *